Sept. 29, 1959 A. D. ODELL ET AL 2,906,890

ELECTRICAL CIRCUITS EMPLOYING TRANSISTORS

Filed March 17, 1955

Inventors
A. D. ODELL
G. I. TURNER
By [signature]
Attorney

United States Patent Office 2,906,890

Patented Sept. 29, 1959

2,906,890

ELECTRICAL CIRCUITS EMPLOYING TRANSISTORS

Alexander Douglas Odell and George Ian Turner, London, England, assignors to International Standard Electric Corporation, New York, N.Y.

Application March 17, 1955, Serial No. 494,954

Claims priority, application Great Britain March 19, 1954

7 Claims. (Cl. 307—88.5)

The present invention relates to electrical circuits for the storage and/or the transmission of information, and especially to such circuits in which transistors are used.

According to the present invention there is provided an electrical circuit for the storage of information which comprises a chain of interconnected transistors each of which is arranged to be bistable, having an "on" state and an "off" state, there being a single transistor in each stage of said chain, and means for storing information on said chain as a pattern comprising any number, including one, of said transistors in the "on" state and any possible spacing of the transistors in the "on" state.

According to the present invention there is further provided an electrical circuit for the storage of information which comprises a chain of interconnected transistors each of which is arranged to be bistable, having an "on" state and an "off" state, there being a single transistor in each stage of said chain, means for storing information on said chain as a pattern comprising any number, including one, of said transistors in the "on" state and any possible spacing of the transistors in the "on" state, and means for applying a pulse train in common to all of said transistors, each pulse of said train causing each said transistor to assume the same state ("on" or "off") as the transistor immediately previous thereto in said chain, whereby said pattern is caused to progress along said chain.

The invention will now be described with reference to the accompanying drawings, in which.

Each of the circuits described herein consists of a chain of point-contact transistors of the type which exhibit a current gain of greater than unity. Such transistors are referred to as current gain transistors, and it is a characteristic feature of such devices that a single device can be used in such a way as to be bistable. The bistable device has a high current or "on" state in which a relatively high collector current flows and a low current or "off" state in which a relatively low collector current flows.

A single transistor connected so as to act as a bistable device is capable of use as a storage device for a single element of information expressed in a two-condition (mark and space, or one and zero) code. In the circuits described herein, the transistors, of which there is one per stage of the register, are each capable of storing one element of the information to be stored. Hence it is possible for any number, including one, of the transistors to be in the "on" state, and there can be any possible spacing of these transistors. Hence information such as printing telegraph code characters or numbers expressed in binary notation can be stored.

The circuits to be described are each provided with pulse connections to all transistors whereby a single pulse applied to all transistors causes the stored information to be moved one stage along the chain of transistors. On its leading edge the pulse causes all transistors which are in the "on" state to assume the "off" state, and on the trailing edge causes each transistor succeeding one which was on to assume its "on" state. Thus each pulse applied in common to all transistors shifts the information stored in the register one stage along the register.

Figure 1:
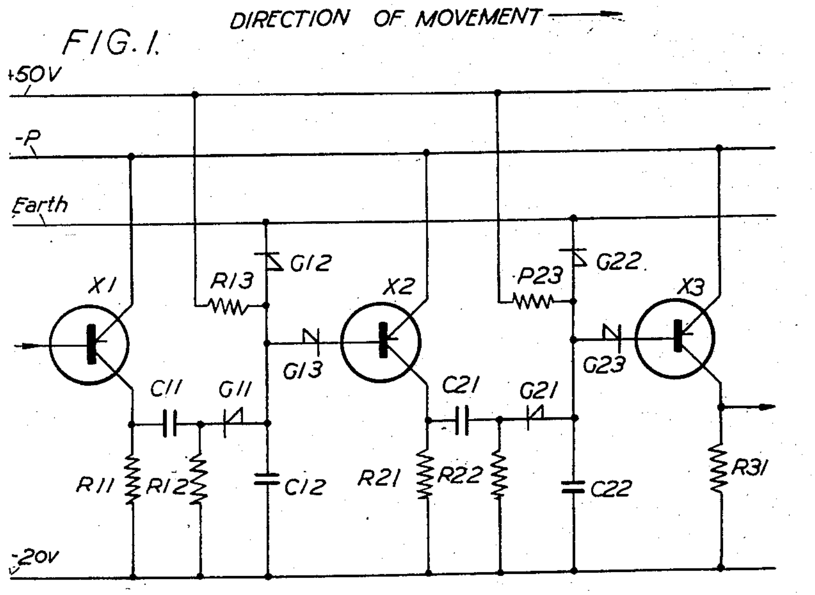
Fig. 1 shows a pattern movement register, also known as a shifting register, according to the present invention.

The circuit of Fig. 1, as already mentioned, shows a pattern movement register, also known as a shifting register, having a single transistor per stage. These transistors are interconnected by circuits such as C11—R12—G11—C12—G13 between transistors X1 and X2, which function as delay circuits. It will be assumed that in the initial state X1 is in the "on" state storing one or mark, and that X2 is in the "off" state, storing zero or space. The pulse input line, marked —P is normally held at —3 volts. The base and collector of X1, which is in its high current or "on" state, are held at a potential slightly negative to that of the emitter due to the action of current gain. The current flowing from the +50 volt line through a resistor R13 and into rectifier G12 in its low resistance direction serves to maintain the base of X2 at or near earth potential. The collector of X2 is held at or about —18 volts, neglecting any current flowing in the collector circuit in the absence of emitter current. Any other transistor in the "on" state is in the same condition as X1, while any one in the "off" state is in the same condition as X2.

A negative shifting or stepping pulse applied to the line P, which is of sufficient width and amplitude, resets all transistors in the "on" state to their "off" state. This happens on the leading edge of the pulse, when the emitter of a transistor, such as X1, in its "on" state is driven negative to the potential of the base. This cuts off the current flowing in X1 and so there is no longer any voltage drop across R11, which is the collector circuit load resistor of X1. Hence the collector voltage of X1 falls towards the voltage of the —20 volt line, that is, it increases in a negative direction. There is substantially no change in the voltage on the collectors of transistors, such as X2 and X3, which are in their "off" state. The negative going change in voltage at the collector of X1 is applied via a coupling capacitor and a rectifier G11 to a capacitor C12, which is connected via a further rectifier G13 to the base of X2. C12 therefore charges negatively to a voltage which will be less, i.e. a lower negative voltage, than that on the collector of X1. The various circuit parameters are such that when the pulse ends the voltage on the upper terminal of C12 will be more negative than —3 volts, the normal condition of the emitters of the transistors. When the pulse ends, all transistors which, such as X2, have their bases connected to a voltage more negative than —3 volts assume their "on" states. Thus X3 continues to be "off" as X2 was "off" before the pulse occurred. X2 assumes its "on" state as X1 was "on" before the pulse occurred, and X1 assumes the same state as the preceding transistor (if any) before the pulse occurred.

It is necessary now to state the purposes of the other circuit components included in the circuit of Fig. 1. The resistor R12, connected from the junction of C11 and G11 to the —20 volts line, discharges C11 in the inter-pulse interval. This discharge is exponential towards —20 volts, but is arrested at the voltage on the right-hand end of G11 by "catching diode" action of G11. At this point it is worth mentioning that the negative pulse produced when X1 is cut off is applied to C11 and C12 in series so both of these capacitors are charged thereby. Rectifier G11, included in the charging circuit of C12, isolates C12 and the circuit of X2 from any positive going charges of the voltage of the collector of X1 when the latter assumes its "on" state. Thus a negative-going pulse which has been passed forward when a transistor in its "on" state is restored to its "off" state by a stepping pulse cannot be neutralised by the early firing of the transistor from which that negative-going pulse came. This could otherwise occur when the stored pattern of information includes two or more adjacent transistors in the "on" state.

The resistor R13, with the rectifier G12, which have already been mentioned stabilises the voltage on the base of X2. Thus R13 ensures that the base of X2 will not be driven negative by such base-collector current as may flow with zero emitter current, while G12 ensures that the base will not be driven above (i.e. positive to) earth potential by current flowing in R13. Finally the rectifier G13 serves to isolate the capacitor C12 from base-emitter conduction in the transistor X2, and thus prevents transient currents due to the discharge of C12 from flowing in the common emitter line.

It will be noted that components in the circuitry interconnecting X1 and X2 all have one as the first digit of their numbers, while those interconnecting X2 and X3 all have two as their first digit.

The register shown in Fig. 1 is set by applying a pattern of information represented by the information to one transistor, normally the first in the chain. This information is represented by a succession of pulse times occupied by a pulse for one (or mark) or no pulse for space (or zero). Such a pulse train is referred to as a binary pulse train since it conveys information expressed in a two-condition code. Each of these pulses, or no pulse where an element is zero (or space), occurs in the interval between two consecutive stepping pulses on the −P line.

Figure 2:
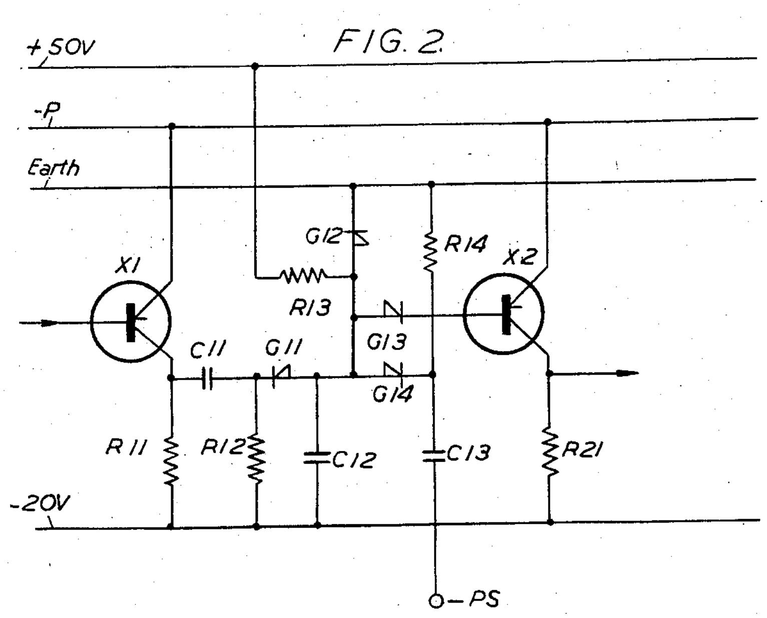
Fig. 2 shows a modification of the circuit of Fig. 1 whereby information can be inserted into the register at one of its intermediate stages.

Fig. 2 shows a modification of one transistor for applying the information at an intermediate point in the chain. This consists of a connection from a pulse input terminal PS over which a negative setting-up pulse is received via a capacitor C13 to a junction between a resistor R14 and a rectifier G14. Thus the pulse from PS reaches the base of X2 via C13, G14 and G13. G14 isolates this circuit from the pulses and voltages generated during the shifting operation and R14 establishes the correct steady-state potential of the junction between C13 and G14.

Where information is to be inserted into the chain in parallel i.e. all digits of a number of character(s) put in at once, the appropriate number of transistors have a circuit such as C13—G14—R14 connected to their base circuits. Then the negative setting-up pulses are simultaneously applied to the PS terminals of all stages to be at 1, this application being effected between two stepping pulses.

Thus a circuit can be provided in which both parallel and serial insertion is possible. Similarly, anyone or more stages can have outputs so that parallel or serial extraction of the stored information can be effected. This permits the circuit to be used as a serial-parallel or parallel-serial converter.

What we claim is:

1. An electrical circuit for the storage of information which comprises a chain of interconnected transistors each of which has a base electrode, an emitter electrode, and a collector electrode, and is arranged to be bistable, having an "on" state and an "off" state, there being a single transistor in each stage of said chain, means for storing information on said chain as a pattern with any number including one, of said transistors in the "on" state and any possible spacing of the transistors in the "on" state, priming means connected between every two transistors for priming the succeeding transistor when the preceding transistor is in the "on" state, means for applying a pulse train in common to all of said transistors, means at each transistor responsive to the termination of a pulse of said train for causing said transistor to assume the "on" state only if said transistor has been primed by said priming means, means for preventing the coming on of a transistor from affecting the priming means between it and the next succeeding transistor, whereby each pulse of said train causes each said transistor to assume the same state ("on" or "off") as the transistor immediately previous thereto in said chain, and said pattern is caused to progress along said chain, said priming means comprising a temporary storage circuit between consecutive transistors, means responsive to the commencement of each pulse applied in common to all of said transistors to cause all transistors not already in the "off" state to assume the "off" state and an electrical condition to be stored in said temporary storage circuit between each transistor whose state is changed and the next transistor in the chain, and said storage circuit comprising a capacitor which is so connected to the collector electrode of the preceding transistor that it charges when said preceding transistor assumes its "off" state, and a connection from said capacitor to the base electrode of the next succeeding transistor such that when said capacitor is charged, the base of said succeeding transistor is at such a voltage that the transistor assumes its "on" state when said pulse ends.

2. An electrical circuit, as claimed in claim 1, in which the means for preventing the coming on of a transistor from affecting the priming means between it and the next succeeding transistor comprising a rectifier in the connection from the capacitor of a storage circuit to the collector of the first transistor of a pair, said rectifier being so poled as to be in the direction of easy conductivity for current flowing away from said capacitor, whereby said rectifier allows the negative-going voltage change produced at said collector when said first transistor assumes its "off" state to charge said capacitor and prevents any positive-going change in the voltage of said collector from influencing the second transistor of said pair of transistors.

3. An electrical circuit, as claimed in claim 2, and in which said pulses are negative-going pulses and the means for applying the pulse train in common to all the transistors comprises means for applying them in common to the emitters of said transistors.

4. An electrical circuit, as claimed in claim 3, and comprising means for applying information to said chain in serial form.

5. An electrical circuit, as claimed in claim 4, in which said means for applying information to said chain in serial form comprises a connection to the base of one of said transistors over which said information is applied as a pulse train, the number and spacing of the pulses of which represents the information, each pulse position in said train being between two of the pulses applied in common to said chain to cause said progression, whereby each said information pulse causes the transistor to which it is applied to assume its "on" state, whereafter a pulse applied in common to all transistors progresses the stored pattern along, and in which said pulses applied in common may be stopped when said information has been completely stored in said chain.

6. An electrical circuit as claimed in claim 3, and comprising means for applying information to said chain in parallel form.

7. An electrical circuit as claimed in claim 6, and in which said means for storing information in said chain in parallel form comprises connections to the base electrodes of a number of said transistors equal to the number of variable elements of the information to be stored, each transistor to which a pulse is applied over one of said connections thereupon assuming its "on" state.

References Cited in the file of this patent

UNITED STATES PATENTS

| | | |
|---|---|---|
| 2,591,961 | Moore et al. | Apr. 8, 1952 |
| 2,594,336 | Mohr | Apr. 29, 1952 |
| 2,614,141 | Edson et al. | Oct. 14, 1952 |
| 2,644,897 | Lo | July 7, 1953 |